(12) United States Patent
Hecht et al.

(10) Patent No.: US 6,176,131 B1
(45) Date of Patent: Jan. 23, 2001

(54) DEVICE FOR MEASURING THE MASS OF A FLOWING MEDIUM

(75) Inventors: Hans Hecht, Muenchingen; Alexander Kromer, Freiberg A. n.; Uwe Konzelmann, Asberg; Henning Marberg, Weil der Stadt, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/169,946

(22) Filed: Oct. 13, 1998

(30) Foreign Application Priority Data

Oct. 11, 1997 (DE) ............................................. 197 44 997

(51) Int. Cl.$^7$ ....................................................... G01F 1/68
(52) U.S. Cl. ........................................................ 73/204.26
(58) Field of Search ........................... 73/204.26, 204.22, 73/204.24

(56) References Cited

U.S. PATENT DOCUMENTS

| | | | |
|---|---|---|---|
| 5,396,795 | * 3/1995 | Araki | 73/204.26 |
| 5,631,416 | * 5/1997 | Rilling et al. | 73/204.26 |
| 5,723,784 | 3/1998 | Lembke et al. . | |

FOREIGN PATENT DOCUMENTS

| | | |
|---|---|---|
| 42 41 333 A1 | 6/1993 | (DE) . |
| 42 19 454 A1 | 12/1993 | (DE) . |
| 195 24 634 A1 | 1/1997 | (DE) . |

OTHER PUBLICATIONS

Breakthrough in Reverse Flow Detection—A New Mass Air Flow Meter Using Micron Silicon Technology, SAE Technical Paper Series, 950433, Feb. 1995.

* cited by examiner

*Primary Examiner*—Harshad Patel
(74) *Attorney, Agent, or Firm*—Ronald E. Greigg; Edwin E. Greigg

(57) ABSTRACT

Known sensor supports have a recess in which a sensor element is glued by means of an adhesive. The device according to the invention has a plate-shaped sensor element that is accommodated in a recess of a sensor support. A sensor region (3) has at least one measurement resistor, which region is exposed to the flowing medium wherein a gap remains between the sensor element and the recess. To protect an evaluation circuit connected to the sensor element against moisture, the provision is made, according to the invention, that at least partial regions of the evaluation circuit and partial regions of the sensor element are covered by a protective coating, wherein the gap has at least one enlargement by means of which the flow of the protective coating can be influenced. The device according to the invention is used for measuring the mass of a flowing medium in the intake air mass of internal combustion engines.

11 Claims, 1 Drawing Sheet

1

DEVICE FOR MEASURING THE MASS OF A FLOWING MEDIUM

BACKGROUND OF THE INVENTION

The invention is based on a device for measuring the mass of a flowing medium. A device of this kind has already been disclosed (DE-OS 195 24 634), having a plate-shaped sensor element accommodated in a recess of a sensor support, and having a sensor region with at least one measurement resistor that is exposed to the flowing medium. The sensor element is partially glued in the recess by means of adhesive and has a contacting region for connection to the at least one active measurement region of the sensor element, and connecting lines lead from this contacting region to an evaluation circuit. The sensor element is mounted in the recess, essentially flush to the wall, in order to obtain a flow at the sensor element without flow separations. Between the sensor element and the walls of the recess, there is a manufacture-conditional gap that cannot be totally prevented for tolerance reasons. Furthermore, the electronic elements of the evaluation circuit as well as the connecting lines to the contacting region of the sensor element must be protected against moisture of the kind that can occur in the operation of the device in a motor vehicle.

OBJECT AND SUMMARY OF THE INVENTION

The device according to the invention has the advantage over the prior art of an improved moisture protection of the evaluation circuit components as well as the connecting lines to the contacting region of the sensor element. Enlargements of a gap that runs between the sensor element and the walls of the recess are particularly advantageous in order to reliably stop a continuous flow in the gap of a protective layer applied at least partially to the evaluation circuit so that the flow path of the protective layer always remains clearly defined.

A dividing wall provided between the evaluation circuit and the sensor element is particularly advantageous and in connection with a covering, this dividing wall permits the reliable protection of components of the evaluation circuit from external influences, wherein an improved flow guidance at the sensor element is additionally achieved. In an advantageous improvement of the invention, the protective layer can also be the adhesive that is used to glue the sensor element in the recess. It is furthermore advantageous that the gap enlargements can be provided without a separate additional cost when manufacturing the sensor support.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
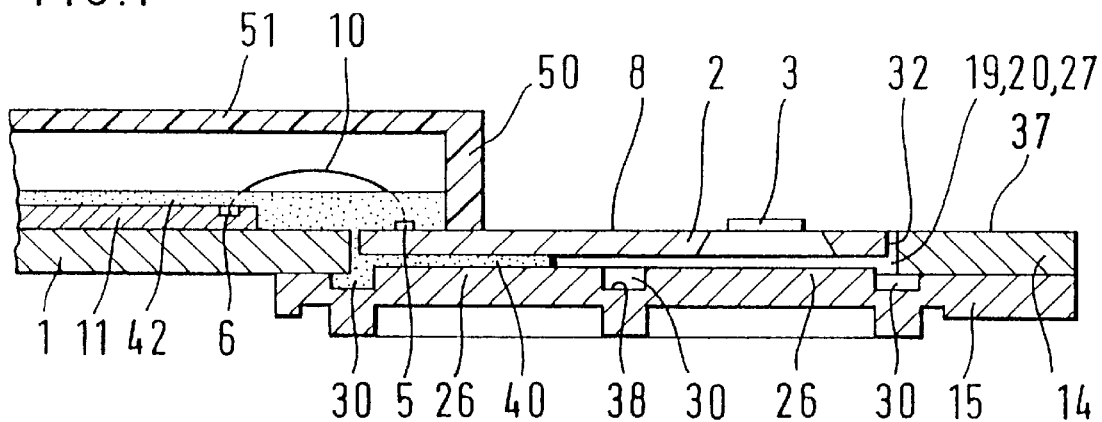
FIG. 1 is a cross sectional representation of a sensor support with a sensor element.

In FIG. 1, a sensor support 1 is shown in cross section, which is provided to receive a plate-shaped sensor element 2. The sensor support 1 and the sensor element 2 are part of a device, not shown in detail, for measuring the mass of a flowing medium, in particular the intake air mass of an internal combustion engine. The sensor element 2 has a membrane-shaped sensor region 3, that is embodied, for example, in the form of a dielectric membrane. The sensor element 2, or the membrane, can be manufactured in a so-called micromechanical fashion by means of etching a semiconductor body, for example a silicon wafer. A heating resistor and different temperature sensors are disposed on the membrane. A heating region is disposed in the center of the membrane, and with the aid of the heating resistor and a temperature sensor, is regulated to an overtemperature whose value depends on the temperature of the flowing air. Upstream and downstream of the heating region, for example two temperature sensors are disposed symmetrical to the heating region and have the same temperature when there is no flow. In the measuring operation or when the sensor region 3 is experiencing flow, in particular, the part of the membrane disposed upstream of the heating region or the temperature sensor is cooled due to the heat transfer in the boundary layer. The temperature sensor disposed downstream of the heating region, though, can approximately retain its temperature by means of the air heated by the heating region. As a result of the temperature difference of the two temperature sensors, in addition to the amount of the flowing medium, its direction can consequently also be determined. The heating region as well as the two temperature sensors are electrically connected to an electronic evaluation circuit 11 by means of strip conductors and by means of connecting lines 10, for example in the form of wires. The evaluation circuit 11 likewise has a number of bonding pads 6 to which the wires 10 can be attached. The evaluation circuit 11 is preferably embodied using thick-film technology and is attached to a substrate. The substrate with the evaluation circuit 11 is glued, for example, to the sensor support 1, which is contained, for example, in another housing part 48 of the device, which part encloses the evaluation circuit 11. The evaluation circuit 11 has a large number of electronic components and is used in a known manner for current or voltage supply of the resistors on the sensor element 2 and for evaluating the electrical signals emitted by the resistors.

Figure 2:
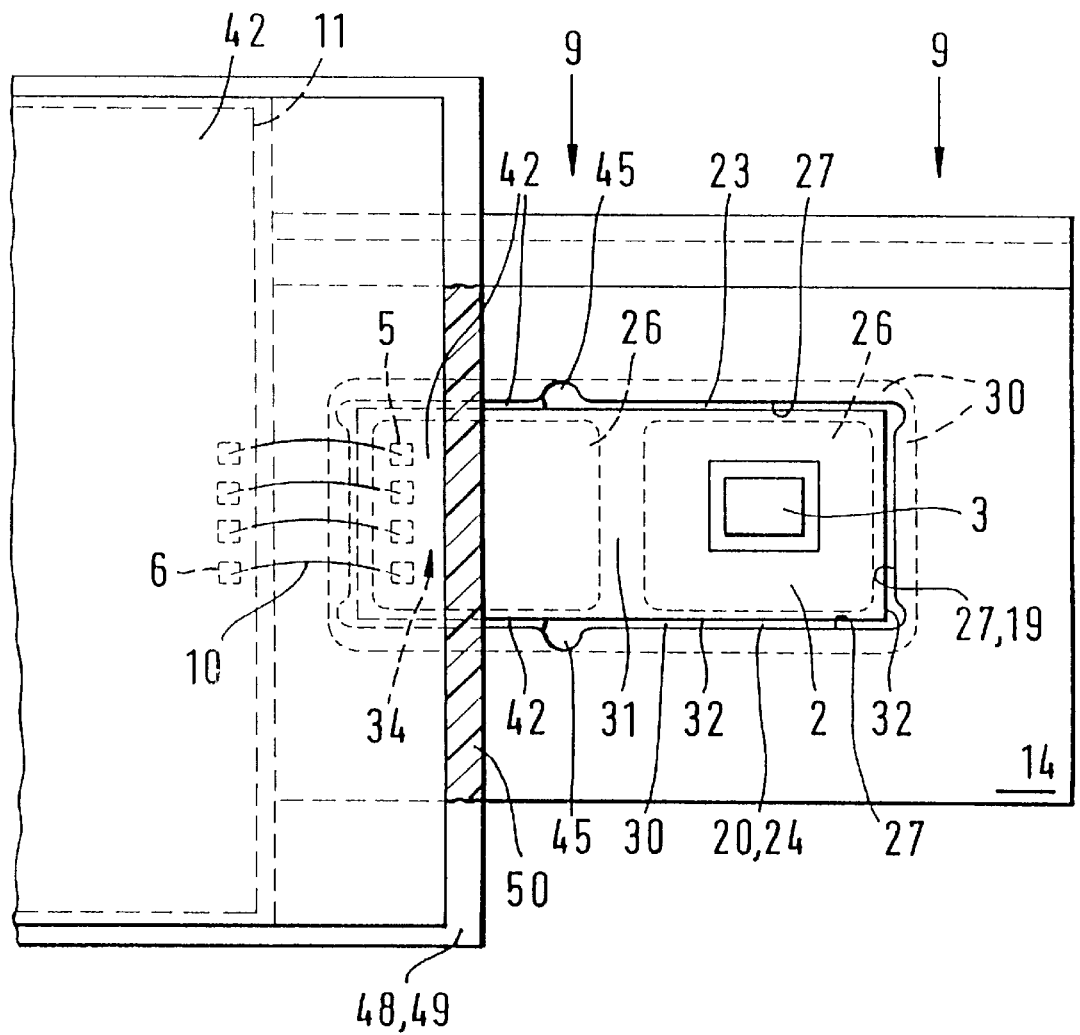
FIG. 2 is a top view of the sensor support according to FIG. 1.

The sensor element 2 has a plate-shaped, for example rectangular shape and is aligned with its largest surface 8 approximately parallel to the medium that is flowing into the plane of the drawing of FIG. 1, wherein a short side of the for example rectangular sensor element 2 extends in the flow direction. The flow direction of the medium is indicated in FIG. 2 by means of corresponding arrows 9. The sensor support 1 is preferably comprised of metal and can be produced by folding a thin metal strip, for which stamping, bending, folding, deep-drawing, and embossing processes are suitable. In the final state of the bent metal strip, for example two elements 14 and 15 that are the same size rest against each other. The element that is not bent and encompasses the sensor element 2 is called the frame element 14 which is a portion of the sensor element 2 and the bent element below the frame element is called the securing element 15. The securing element 15 covers an opening 19 of the frame element 14 in order, together with the frame element 14, to define a recess 20 for containing the sensor element 2. The sensor element 2 is accommodated in the recess 20 with its surface 8 approximately flush to a surface 37 of the frame element 14. A bottom surface 38 of the recess 20 has, for example, two plateau-shaped raised areas 26. The sensor element 2 is glued to the raised area 26 shown on the left in FIGS. 1 and 2 by means of an adhesive 40 so that the sensor region 3 is held in the recess 20 in a quasi-cantilevered fashion. A channel-shaped recess 30 runs between the plateau-shaped raised areas 26 themselves as well as between the plateau-shaped raised areas 26 and the walls 27 defining the recess 20. The walls 27 can be embodied with an offset so that a part of the channel-shaped recess 30 is overhung by the walls 27.

In the top view according to FIG. 2, the sensor element 2 has a slightly smaller cross section than the recess 20 so that along the circumference of the sensor element 2, an extremely small gap 23 is produced on the upstream side and an extremely small gap 24 is produced on the downstream side, between the continuous side faces 32 of the sensor element 2 and the walls 27 of the frame element 14. The gap 23, 24 has a width that is on the order of magnitude of a few micrometers.

In order to protect the components of the evaluation circuit 11 that are not shown in detail and to protect a partial region 34 of the sensor element 2 that encompasses the bonding pad 5, the provision is made, according to the invention, to cover at least partial regions of the evaluation circuit 11 and the partial region 34 of the sensor element 2 with a protective coating 42. The protective coating 42 can, for example, be a silicon gel that can flow when applied and only hardens after a certain time. It can also be the same adhesive 40 that is used to glue the sensor element 2 in the recess 20. When applying the protective coating 42 to the evaluation circuit 11, this still flowing medium also travels into the gap 23, 24 of the recess 20. The flowing of the medium of the protective coating 42 is influenced by the capillary forces of the gap 23 or 24. In order to be able in the course of this to prevent an indefinite continuation of the protective coating medium 42 in the gap 23, 24, gap enlargements 45 are provided, which are disposed, for example, as shown in more detail in FIG. 2, in the region of the raised area 26 situated on the left in FIG. 2, in the vicinity of a section 31 of the channel-shaped recess 30, which section extends in the flow direction 9, approximately representing the center of the recess 20. The gap enlargements 45 preferably have a semicircular, triangular, or rectangular shape and can be produced on the walls 27 with the manufacture of the sensor support 1, for example by means of stamping, without a great deal of additional expense. The gap enlargements 45 thus represent regions which are incorporated as indentations into the walls 27 of the recess 20 or the sensor element 2. Without this kind of gap enlargements 45, there is the danger that the medium of the protective coating 42 can travel into the gap 23, 24 in the vicinity of the sensor region 3 of the sensor element 2. However, this would then result in an undesirable heat dissipation from the sensor region 3 to the sensor support 1.

A dividing wall 50 preferably comprised of plastic is provided to divide the sensor support 1, which is circulated around and is provided with the sensor element 2 and the sensor region 3, from the electronics region equipped with the evaluation circuit 11. The dividing wall 50 rests against the surface 8 of the sensor element 2 and against the surface 37 of the frame element 14 of the sensor support 1. When applying the protective coating 42 to the evaluation circuit 11, this dividing wall 50 stops a continuous flow so that the protective coating 42 can only flow continuously in the gaps 23, 24 until reaching the gap enlargements 45. As shown in FIG. 1, the protective coating 42 also at least partially covers the wires 10 to protect them. In order to secure the dividing wall 50, it is accommodated, for example, so that it can be slid into a pincer-shaped border 49 of the evaluation circuit 11, which can, for example, be part of the sensor support 1 or also part of another housing part 48 of the device. It is also possible, as shown in FIG. 1, to provide a covering in the form of a cover 51 that encloses the evaluation circuit 11 and also supplies the dividing wall 50.

The foregoing relates to preferred exemplary embodiments of the invention, it being understood that other variants and embodiments thereof are possible within the spirit and scope of the invention, the latter being defined by the appended claims.

We claim:

1. A device for measuring the mass of a flowing medium, in the intake air mass of internal combustion engines, comprising a plate-shaped sensor element (2) that is accommodated in a recess (20) of a sensor support (1), a region (3) of the sensor element includes at least one measurement resistor, said sensor region is exposed to the flowing medium and is secured in the recess at a raised area of a bottom surface of the recess by means of an adhesive, an evaluation circuit (11) for evaluating electrical signals received from the measurement resistor, wherein a gap (23, 24) remains between the sensor element and wall surfaces (27) defining the recess, at least partial regions of the evaluation circuit (11) and partial regions (34) of the sensor element (2) are covered by a protective coating (42) and the gap (23, 24) has at least one enlargement indentation (45) between the wall surfaces (27) by which a flow of the protective coating (42) which partially fills the gap (23, 24) is prevented from flowing beyond the at least one enlargement indentation (45).

2. The device according to claim 1, in which a dividing wall (50) is provided between the evaluation circuit (11) and the sensor element (2).

3. The device according to claim 2, in which the dividing wall (50) is comprised of plastic.

4. The device according to claim 3, in which the dividing wall (50) is accommodated in a pincer-shaped border (49) of the evaluation circuit (11).

5. The device according to claim 2, in which the dividing wall (50) is part of a cover (51) of the evaluation circuit (11).

6. The device according to claim 5, in which the dividing wall (50) is accommodated in a pincer-shaped border (49) of the evaluation circuit (11).

7. The device according to claim 1, in which the at least one gap enlargement (45) has a semicircular shape.

8. The device according to claim 1, in which the at least one gap enlargement (45) is provided in the recess between the sensor region (3) of the sensor element (2) and connections (5) of the sensor element (2).

9. The device according to claim 1, in which the protective coating (42) is comprised of a silicon gel.

10. The device according to claim 9, in which the adhesive (40) for gluing the sensor element (2) in the recess (20) is used as the protective coating (42).

11. The device according to claim 1, in which the adhesive (40) for gluing the sensor element (2) in the recess (20) is used as the protective coating (42).

* * * * *